United States Patent [19]
Cohen

[11] Patent Number: 6,026,464
[45] Date of Patent: Feb. 15, 2000

[54] MEMORY CONTROL SYSTEM AND METHOD UTILIZING DISTRIBUTED MEMORY CONTROLLERS FOR MULTIBANK MEMORY

[75] Inventor: Gary Leon Cohen, Sunnyvale, Calif.

[73] Assignee: Cisco Technology, Inc., San Jose, Calif.

[21] Appl. No.: 08/881,551

[22] Filed: Jun. 24, 1997

[51] Int. Cl.[7] ................................................. G06F 13/364
[52] U.S. Cl. .............................. 711/5; 711/151; 711/150; 710/241; 710/244; 710/242
[58] Field of Search ................... 711/5, 146, 150, 711/151, 158, 168, 169, 157; 395/299, 300, 842, 848, 859, 860, 730, 731, 732; 710/119, 120, 22, 28, 39, 40, 242, 243, 244, 241, 113

[56] References Cited

U.S. PATENT DOCUMENTS

| | | | |
|---|---|---|---|
| 4,644,532 | 2/1987 | George et al. | 370/255 |
| 4,818,932 | 4/1989 | Odenheimer | 324/121 R |
| 5,014,265 | 5/1991 | Hahne et al. | 370/236 |
| 5,168,558 | 12/1992 | Natusch et al. | 711/168 |
| 5,412,788 | 5/1995 | Collins et al. | 711/157 |
| 5,440,713 | 8/1995 | Lin et al. | 711/158 |
| 5,463,755 | 10/1995 | Dumarot et al. | 711/148 |
| 5,594,876 | 1/1997 | Getzlaff et al. | 710/113 |
| 5,761,731 | 6/1998 | Van Doren et al. | 711/155 |
| 5,784,582 | 7/1998 | Hughes | 710/117 |
| 5,870,572 | 2/1999 | Garcia | 710/129 |

*Primary Examiner*—Glenn Gossage
*Attorney, Agent, or Firm*—Marger Johnson & McCollom

[57] ABSTRACT

A memory control system and method for controlling access to a global memory. The global memory has multiple memory banks coupled to a memory bus. Multiple memory controllers are coupled between processing devices and the memory bus. The memory controllers control access of the processing devices to the multiple memory banks by independently monitoring the memory bus with each memory controller. The memory controllers track which processing devices are currently accessing which memory banks. The memory controllers overlap bus transactions for idle memory banks. The bus transactions include a control bus cycle that initially activates the target memory bank and data bus cycles that transfer data for previously activated memory banks. A control bus arbiter coupled to the memory bus grants activation of the multiple memory banks according to a first control bus request signal and a separate data bus arbiter operating independently of the control bus arbiter grants data transfer requests according to a second data bus request signal.

19 Claims, 6 Drawing Sheets

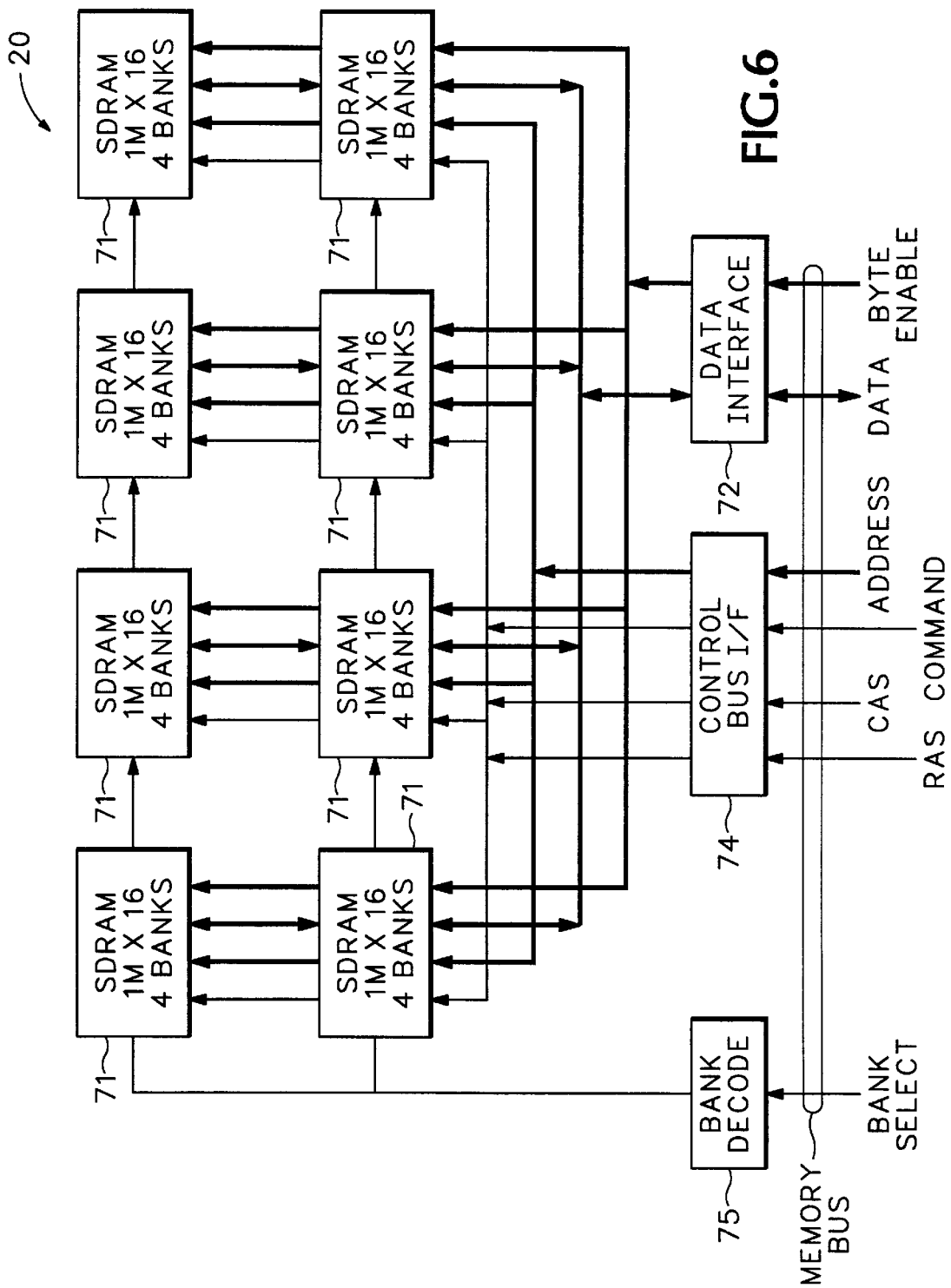

MEMORY CONTROL SYSTEM AND METHOD UTILIZING DISTRIBUTED MEMORY CONTROLLERS FOR MULTIBANK MEMORY

This invention relates to a memory control system and more particularly to distributed memory controllers that combine to increase the performance of a memory system.

Most computer systems use Dynamic Random Access Memory (DRAM) as a bulk random access storage element. DRAM is inexpensive, relatively high speed and widely produced. Modem DRAM devices have the characteristic that the initial access of the memory has a much longer latency than subsequent adjacent accesses. DRAMs are most efficient as burst access devices. For typical access patterns, the length of the initial access latency for the DRAM determines the memory system performance.

A typical optimization technique used in DRAM systems interleaves multiple DRAM banks, and overlap the accesses into these banks. This increases the memory system throughout by overlapping the initial latency for multiple access. This is typically implemented by aligning each memory bank on sequential word boundaries so subsequent accesses have reduced latency. During burst mode, the advantage of the word boundary alignment optimization is eliminated. The multiple bank approach also separates banks of memory onto cache line or larger boundaries.

However, current memory controllers cannot efficiently overlap accesses to the multiple memory banks. Some existing DRAM based systems try to optimize the use of two memory banks. The best case access patterns can reduce the average memory latency by 50%. However, typical interactions between memory accesses decrease this improvement.

U.S. Pat. No. 5,168,558 to Natusch et al. discloses another memory access optimization technique that divides a memory subsystem into multiple memory banks. Each memory bank includes a separate controller connected to a global memory unit bus. The system in Natusch only supports local data structures accessed by a single processing element. If the memory system is global and accessed by multiple independent devices, the data structures must be copied between each memory subsystem. When different independent devices try to access the memory system at the same time, each memory request is processed serially in the order received. Thus, bottlenecks occur for highly utilized memory banks to delay access to other less utilized memory banks.

Accordingly, a need remains for a global memory system that allows multiple independent devices to access multiple memory banks at the same time.

SUMMARY OF THE INVENTION

A global memory system is organized into multiple memory banks, each allowing independent burst access. Control for the global memory system is distributed to each device or shared among a small set of devices that access a memory subsystem. Each of the memory controllers monitors bus access by all the other memory controllers and maintains state information about different memory banks within the memory subsystem.

The memory controllers each receive requests from devices to read and write direct memory access (DMA) requests and central processing unit (CPU) requests. The memory controllers dispatch the requests to free memory banks, independently of the order the requests are received from the devices. The memory controllers enable the maximum number of memory banks to be used at all times, thus minimizing the affect of initial DRAM latency. Distributed memory control prevents a single device from dominating or creating a bottleneck in the global memory system and increases utilization of the global memory by overlapping memory accesses to different memory banks.

Separate control bus and data bus transactions are conducted by each memory controller. The control bus and the data bus transactions are each controlled by separate arbiters that allocate usage of the memory subsystem to the different memory controllers. Each memory controller first arbitrates for use of the control bus to activate a memory bank. Each memory controller then arbitrates again for use of the data bus to read or write data from the activated memory bank, and finally arbitrates for the control bus to conclude the transaction and precharge the accessed memory bank. Either a prioritized or fair arbitration scheme is used.

The distributed memory controllers allow independent memory access devices to access different regions of memory at the same time. For example, in one embodiment of the invention, the global memory system is used in a network router containing multiple CPUs running independent code threads and DMA devices each reading and writing to different memory banks within the memory subsystem. In this environment, memory accesses from the different CPU and DMA devices are generally unrelated to each other and access different memory locations. DRAM efficiency is increased because each of the distributed memory controllers can perform independent memory accesses in parallel with other memory controllers.

Each memory controller consists of a memory state machine that monitors the memory bus to determine the state of each memory bank. A master controller includes decision logic that receives requests from CPU or DMA devices and dispatches the requests to the memory subsystem. Since each memory controller only receives requests from a small set of CPU or DMA devices, the decision logic is simplified. The complexity of the decision logic greatly increases with each new requesting device, and the number of input buses for the memory requests. Thus, the distributed memory controllers are much simpler than a single main memory controller. Each memory controller is further simplified by moving logic for controlling interactions between the memory controllers to the bus arbitrator.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 is a block diagram of a memory subsystem for the global memory system shown in FIG. 1.

DETAILED DESCRIPTION

Figure 1:
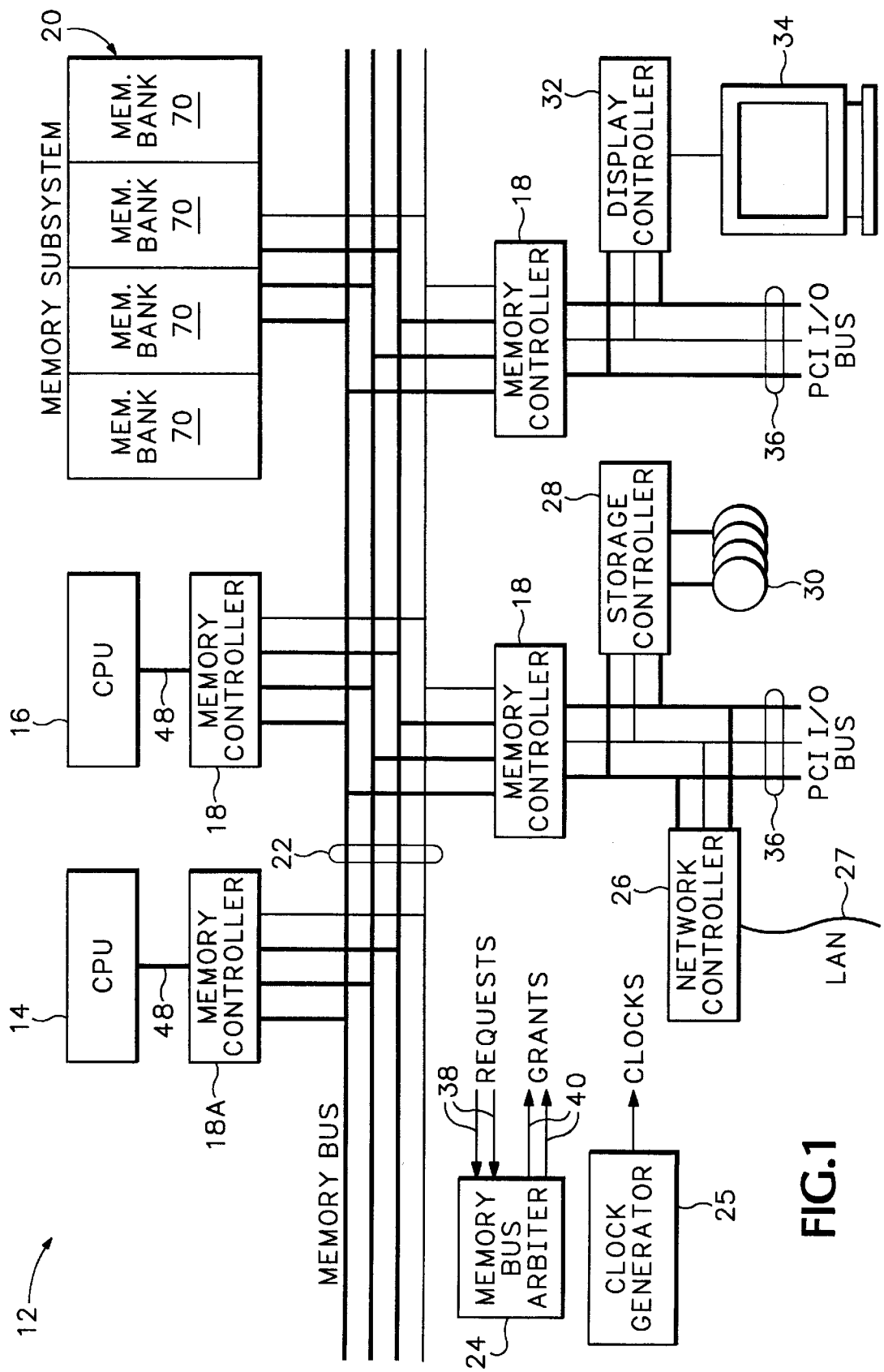
FIG. 1 is block diagram of a global memory system according to the invention.

Referring to FIG. 1, a global memory system (or simply, memory system) 12 includes a memory bus 22 coupled to a memory subsystem 20, central processing units (CPUs) 14 and 16 and multiple input/output (I/O) buses 36. The CPUs 14 and 16 and the devices connected to the multiple I/O buses 36 are each referred to generally as a processing system. The I/O buses 36 are peripherial component interconnect (PCI) I/O buses and are connected to various peripherals such as a network controller 26 coupled to a local area network (LAN) 27, storage controller 28 coupled to hard disk devices 30 and a display controller 32 coupled to a display terminal 34. The CPUs 14 and 16 and I/O buses 36 are coupled to the memory bus 22 through separate distributed memory controllers 18.

The memory subsystem 20 is composed of multiple synchronous dynamic random access memory (SDRAM) circuits organized into multiple memory banks 70. The memory subsystem 20 includes a synchronous I/O interface 72, 74 (FIG.6) that operates from a common clock generated by a clock generator 25 (FIG. 1). The I/O interface 72, 74 operates at high speed allowing overlap of operations from the different memory controllers 18. The I/O interface 72, 74 in the memory subsystem 20 is command driven performing transactions when commanded by a bus master. The bus master will be one of the memory controllers 18 acting on behalf of the associated processing device(s) 14, 16, 26, 28 or 32.

The definitions of memory access commands for the memory subsystem 20 are as follows:

activate: Initiate a memory transaction. Move data into the input/output buffers 72 (FIG. 6) of the SDRAM.

read: Read data from the input/output buffers 72. Data is typically available 2–3 clock cycles after this command.

write: Write data into the input/output buffers 72. Data is immediately copied from the data bus 22 to the input/output buffers 72.

precharge: Complete a memory transaction. Move the data back into the storage array. Some read and write commands also perform a precharge.

Each memory controller 18 is a bridge or translator between one type of bus such as a CPU bus 48 or the PCI I/O bus 36 and the memory bus 22. Each memory controller 18 contains a state memory for each memory bank 70 within the memory subsystem 20. All transactions on the memory bus 22 are "snooped" or monitored by each memory controller 18 to determine which memory banks 70 are correctly being accessed.

The memory controller 18 receives access requests from the connected processing device(s), and then checks the state of the addressed memory bank 70. For example, memory controller 18A reviews requests from CPU 14. If that targeted memory bank 70 is idle, the memory controller 18 arbitrates for the memory bus 22 and "activates" that memory bank 70. Each memory controller 18 sees the activate command and marks that memory bank 70 as busy. When the data for the activated memory bank 70 is ready for access, the memory controller 18 arbitrates a second time for a data bus transaction. When granted the data bus, the memory controller 18 bursts the data from the memory subsystem 20 for a read or writes the data into the memory subsystem 20. When the data bus transaction is completed, each memory controller 18 marks that memory bank 70 idle.

Each memory controller 18 queues accesses to memory banks 70 that are currently busy, and completes the queued accesses when the memory bank 70 is free. If other memory requests are received for free memory banks, after the queued accesses, the memory controller 18 processes the requests for the free memory banks, out-of-order. Processing memory requests out of order increases memory throughput since one busy memory bank will not delay access to other available memory banks.

Each memory controller 18 is connected to a memory bus arbiter 24 that controls access to the shared memory bus 22. The arbiter 24 receives two request signals 38 and provides two grant signals 40 to each memory controller 18. The memory controller 18 and the arbiter 24 conduct separate control bus transactions for memory control functions and data bus transactions for data transfers.

Memory Bus Transactions

Figure 2:
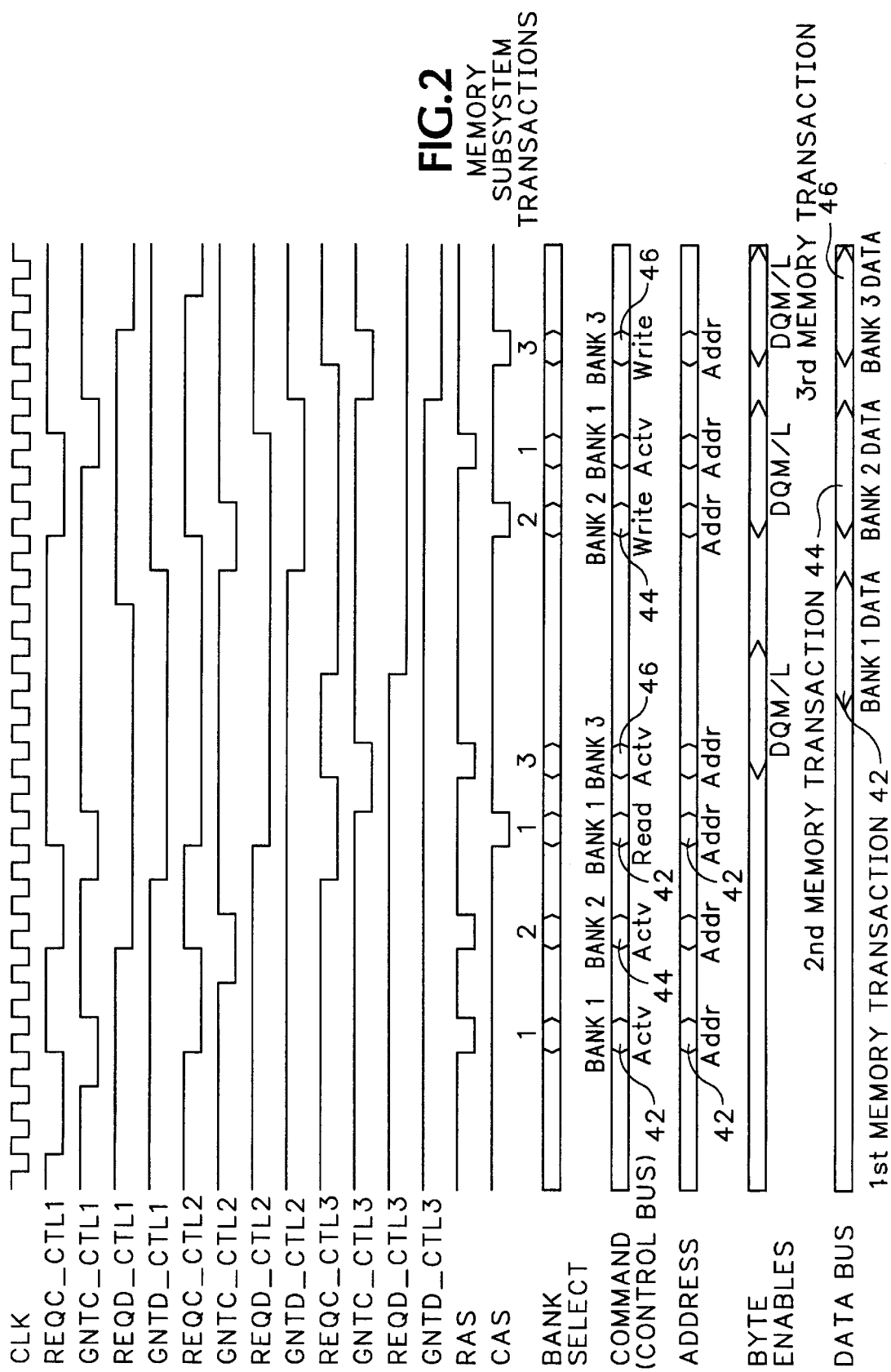
FIG. 2 is timing diagram showing a typical set of overlapped memory transactions for the global memory system in FIG. 1.

Referring to FIG. 2, the memory controller 18 initiates a bus transaction on behalf of the connected processing device (CPU 14, 16 or PCI I/O buses 36) by first asserting a control bus request signal REQC_CTL. The arbiter 24 issues the control bus grant signal GNTC_CTL when the control bus is idle. After receiving the GNTC_CTL signal, the memory controller 18 asserts an "activate" signal on command lines, bank select, RAS, and the RAS address. This initiates a memory read or write to the memory bank address.

The memory controller 18 waits a predetermined number of clocks for the addressed memory bank to access the address. The memory controller 18 then asserts REQC_CTL and REQD_CTL indicating it wants to access the addressed memory bank 70. The arbiter 24 asserts both GNTC_CTL and GNTD_CTL when both the control bus and data bus are idle. The memory controller 18 now issues either a "read" or "write" command, bank select, CAS and the CAS address. For "reads" the data is presented after a predetermined number of clocks specified in the CAS latency. For "writes" the data is accepted immediately by the previously activated memory bank.

While the first memory transaction is completing, other memory controllers 18 are monitoring activity on memory bus 22 and asserting their REQC_CTL signals when the targeted memory bank is idle. The arbiter 24 grants access to the control bus to other memory controllers 18 even if the data bus is busy. For example, a second memory controller 18 asserts REQC_CTL2 for a second memory bank and the arbiter 24 grants GNTC_CTL2, while the first memory controller 18 is still conducting a memory transaction with the first memory bank. This allows multiple memory banks 70 to be "activated" at the same time. The arbiter 24 only issues a single GNTD_CTL signal to one memory controller 18 to insure no conflicts on the data bus. Once a memory controller 18 has "activated" a memory bank, no other memory controller 18 accesses the activated memory bank until the data transaction is completed and the memory bank is precharged.

The timing diagram in FIG. 2 shows a typical set of overlapped memory transactions. A first memory transaction 42 initiates activation for memory bank 1. While the memory controller 18 is waiting for memory bank 1 to activate the targeted memory bank location, a second memory transaction 44 initiates activation for a second memory bank 2. Either the same or different memory controllers can initiate the memory transactions 42 and 44. After a predetermined number of clock cycles, a data bus transaction is initiated for the first memory bank 1 by sending a read command to the activated memory bank 1.

A third memory transaction 46 initiates activation of a third memory bank 3 while the first memory transaction 42 is conducting the data bus transaction and while the second memory transaction 44 is waiting for activation of memory bank 2. After the memory controller 18 completes the data read from the first data bank 1, the second memory transaction 44 begins a data bus transaction by sending a write command to the second data bank 2. After completion of memory transaction 44, the third memory transaction 46 begins a data bus write to the third memory bank 3.

DRAM latency does not adversely effect the performance of memory subsystem 20 because memory transactions for different memory banks 70 are queued up and then interleaved during these latency periods. As shown by the timing diagram in FIG. 2, the time period between each data transfer for memory banks 1, 2, and 3 is less than the latency period required to access the DRAMs. Thus, the overall performance of the memory subsystem 70 is increased.

Figure 3:
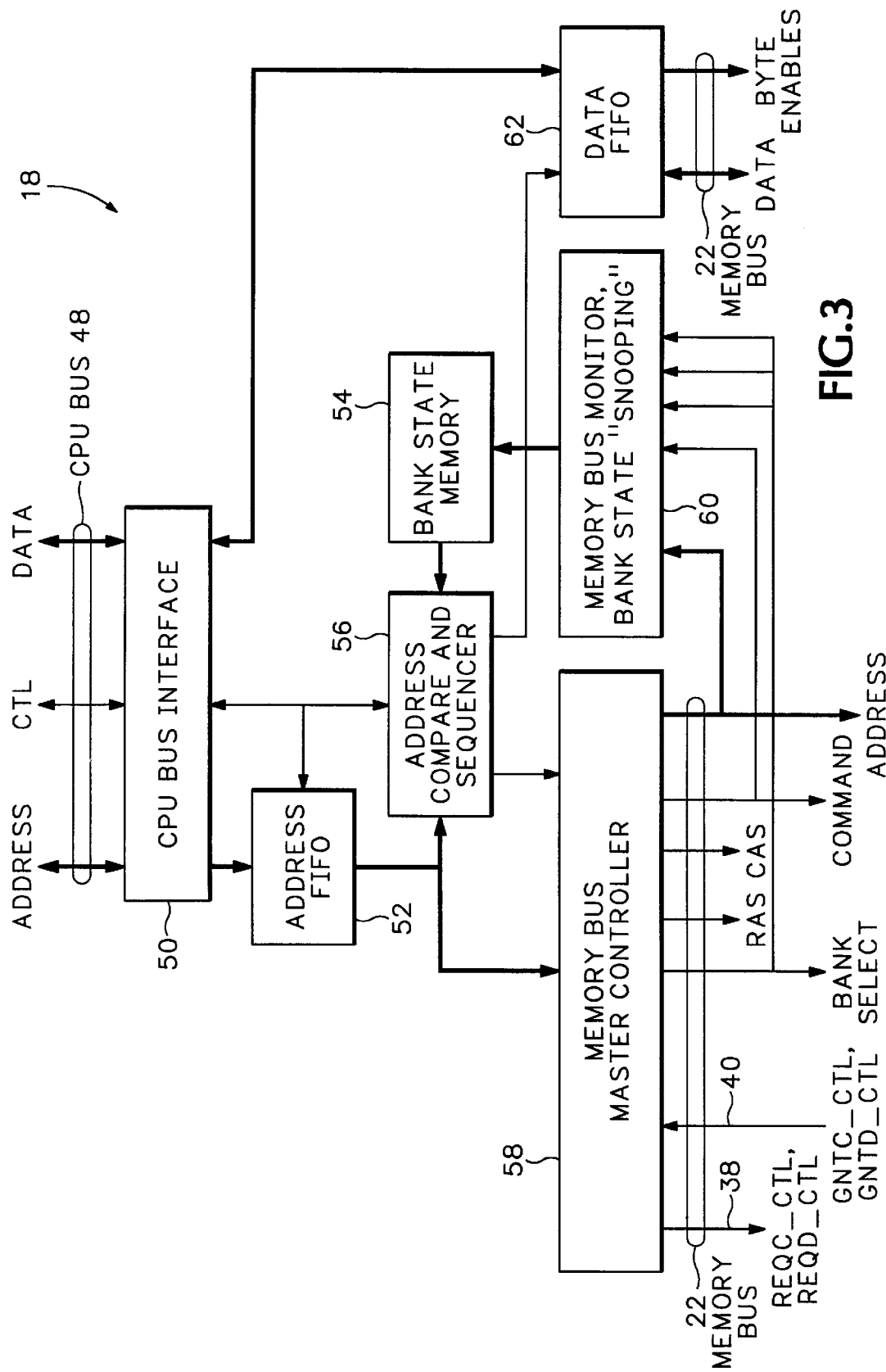
FIG. 3 is a detailed diagram of a memory controller used for the global memory system shown in FIG. 1.

FIG. 3 is a detailed diagram for one of the memory controllers 18 previously shown in FIG. 1. The memory controller 18 provides an interface between a first bus 48 and the memory bus 22. Each memory controller 18 monitors the memory bus 22 and maintains information about the state of each memory bank 70 in the memory subsystem 20 (FIG. 1). In the example shown in FIG. 3, the first bus 48 comprises a CPU bus but could be any bus such as the PCI I/O bus 36 used to transfer data from a processing device. Interfaces between the PCI I/O bus 36 and for other types of peripherals have similar implementations as that shown in FIG. 3.

The memory controller 18 includes a memory bus master controller (or simply, master controller) 58 and a data first in-first out (FIFO) buffer 62 that interface with the memory bus 22. A memory bus monitor 60 monitors transactions on the memory bus 22 and is coupled to the master controller 58. A bank state memory 54 is coupled between the memory bus monitor 60 and an address compare and sequencer 56. A CPU bus interface 50 is coupled to an address FIFO 52 and to the data FIFO 62. The address FIFO 52 is coupled to the address compare and sequencer 56 and the master controller 58.

The CPU bus interface 50 receives transaction requests (read or write) from processing devices such as the CPU 14. The bus interface 50 translates the signals from the processing device for use on the memory bus 22. The address on the CPU bus 48 is stored in the address FIFO 52. For write transactions, the write data is stored in the data FIFO 62. The address is decoded into a memory bank and offset value, and a state for the identified memory bank 70 is determined by the address compare and sequencer 56. If the identified memory bank 70 is currently BUSY, the transaction is tagged as pending and saved in the FIFOs 52 and 62. If the identified memory bank is IDLE, a memory bus cycle is initiated as previously described in FIG. 2. Pending memory bus cycles are activated by the memory bus monitor 60 when the state for the targeted memory bank changes to IDLE.

The master controller 58 initiates the memory bus cycle by asserting REQC_CTL and waiting for the GNTC_CTL from arbiter 24. When the memory controller is granted the memory bus 22, the memory bank 70 is first "activated", then a data read or write cycle is performed, and finally a "precharge" command is issued to close the memory bank. Once the master controller 58 has "activated" the memory bank 70, no other memory controllers 18 will attempt access until that memory bank is released by a "precharge" command. This is implemented by the memory bus monitor 60 and prevents different devices from accessing the same memory locations during a bus cycle. Each master controller 58 can control any memory bank 70 within the memory subsystem 20 (FIG. 1).

The memory bus monitor 60 monitors all bus commands, control signals, and the bank selection bits transmitted from each memory controller 18. The bank state memory 54 contains an entry for each memory bank 70 within the memory system 20 that indicates the current state of the memory bank (BUSY or IDLE) and counters indicating the "activate" status and "precharge" status. The status of memory bus monitor 60 signals to the master controller 58 changes to initiate pending memory transactions. The different circuits in the memory controller 18 are implemented in combinational logic and registers.

Figure 4:
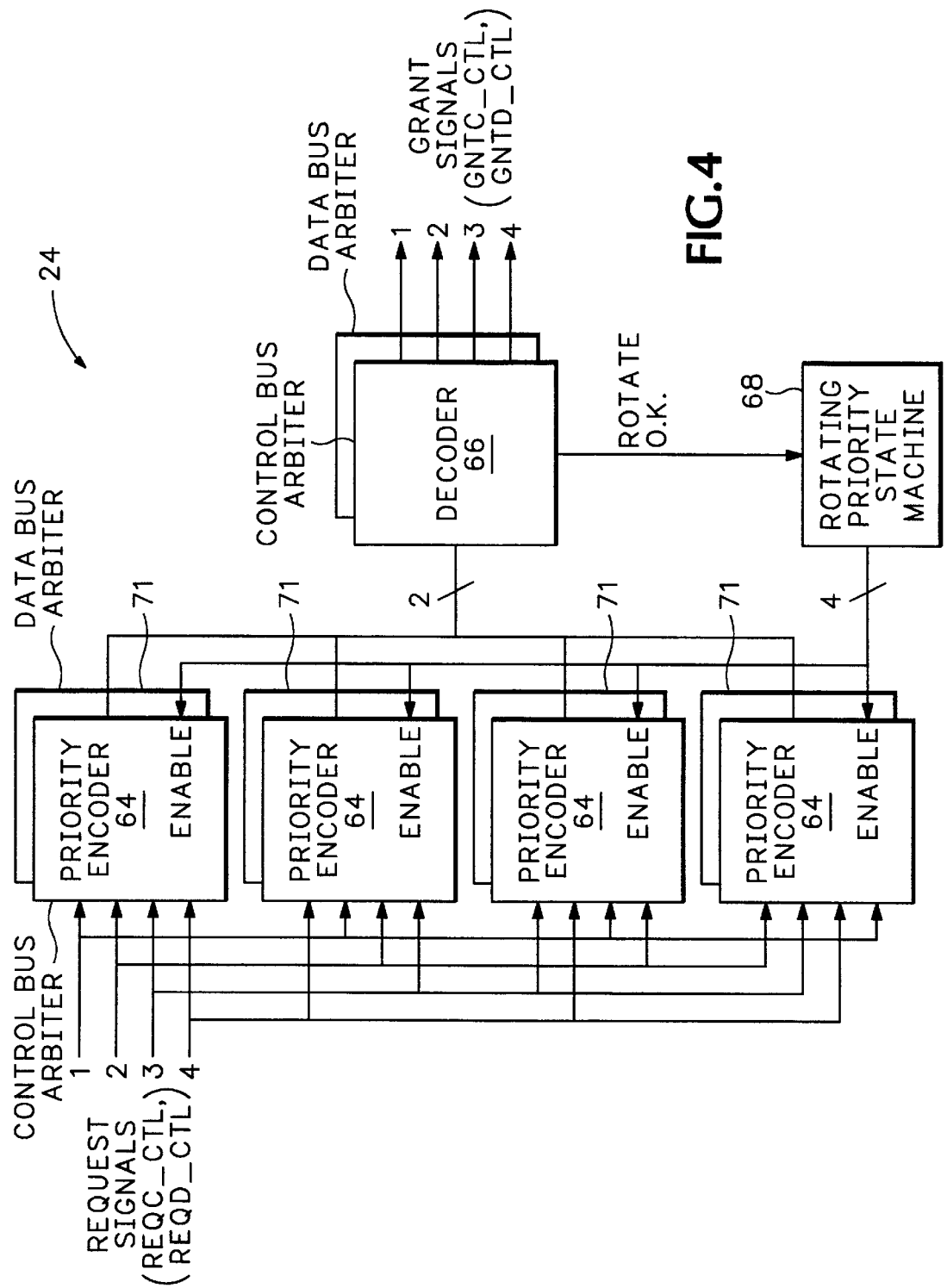
FIG. 4 is a detailed diagram of a memory bus arbiter for the global memory system shown in FIG. 1.

Referring to FIG. 4, as well as FIG. 1, the memory bus arbiter 24 controls transactions on the main memory bus 22. The arbiter 24 insures that only a single memory controller 18 uses the memory bus 22 at any time, and also insures fair distribution of the bus resources. The arbiter 24 is shown implemented for 4 bus masters (memory controllers) but is expandable to any number of bus masters.

The arbiter 24 receives four REQUEST signals, one from each memory controller 18 in the global memory system 12. The REQUEST signals can be generated at any time. The arbiter 24 evaluates the REQUEST signals and produces a single GRANT signal that corresponds to the highest priority requestor. The priority is rotated to insure fair and evenly distributed access to the memory bus 22.

The arbiter 24 includes 4 priority encoders 64 that each produce an output code corresponding to the highest priority input. A state machine 68 determines which priority encoder 64 is enabled during a bus cycle. A first set of four priority encoders 64 are used for receiving the REQC_CTL signals and a first one of the decoders 66 are used for generating the GNTC_CTL signals. The encoders 64 and one of the decoders 66 referred to generally as a control bus arbiter. A second set of four priority encoders 71 are used for receiving the REQD_CTL signals and a second one of the decoders 66 is used for transmitting the GNTD_CTL signals. The encoders 71 and the second one of the decoders 66 referred to generally as a data bus arbiter.

Figure 5:
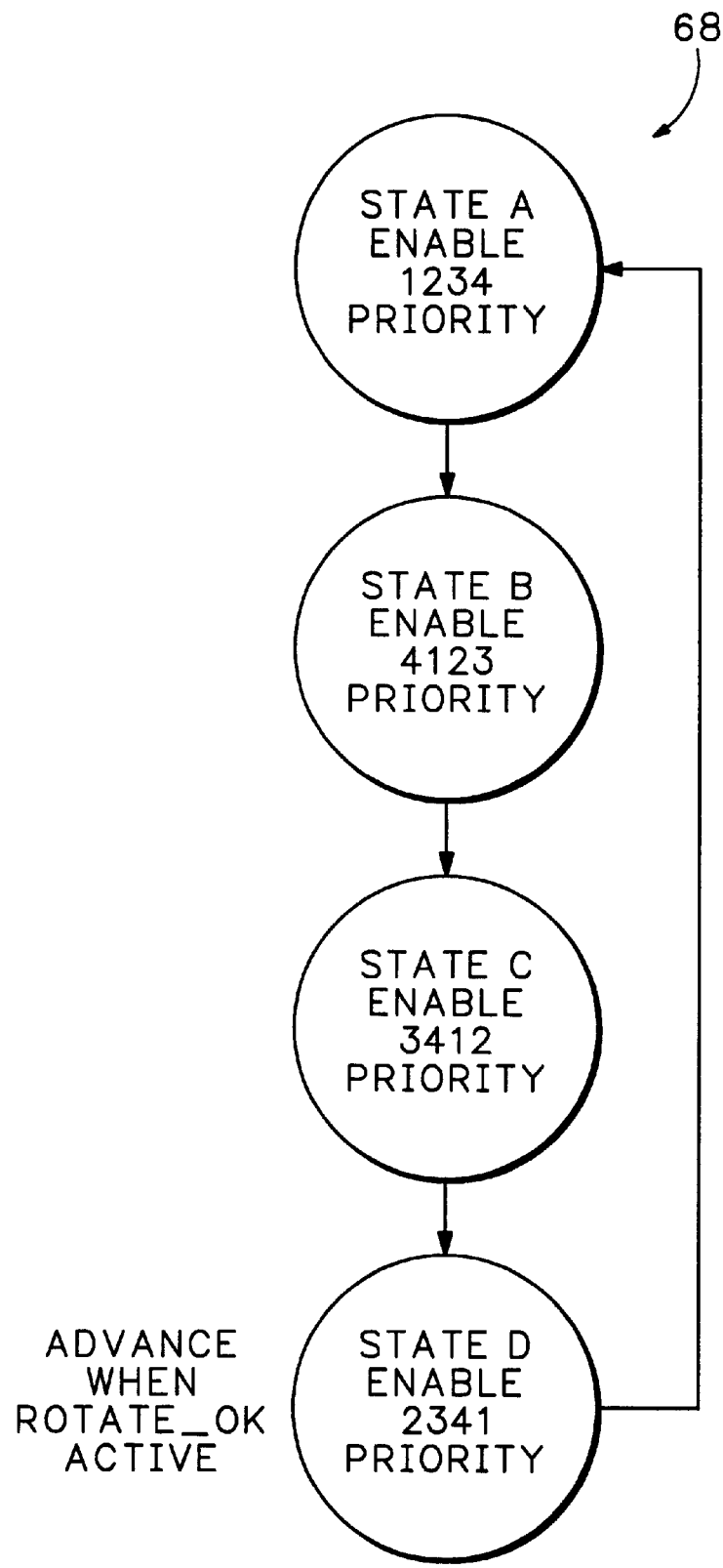
FIG. 5 is a state diagram for the memory bus arbiter shown in FIG. 4.

Referring to FIG. 5, the state machine 68 changes state on every clock cycle until a GRANT signal is issued. During state A, memory controller 1 has highest priority, memory controller 2 has second highest priority, etc. The state machine 68 changes to state B during the next clock cycle where memory controller 4 has highest priority, memory controller 1 has second highest priority, etc. Accordingly, in state C, memory controller 3 has highest priority and in state D, memory controller 2 has highest priority. When a GRANT signal is activated, the ROTATE OK signal from the decoder 64 is asserted. The state machine waits until the corresponding REQUEST is deasserted before advancing to the next state.

Referring to FIG. 6, the memory subsystem 20 is composed of multiple SDRAM integrated circuits 71 interconnected into a multi-bank structure. The SDRAMs are connected to form an 8 bank, 64 bit wide memory. Each SDRAM integrated circuit 71 contains 2 Mbytes organized as 4 independent banks of 512K each. Eight of the SDRAM integrated circuits 71 are interconnected as shown in FIG. 6. Buffers 72 and 74 isolate the memory bus address, data, and control signals on the memory bus 22 from the SDRAM integrated circuits 71.

A bank decode 75 enables one of the four memory banks in each one of the eight SDRAM integrated circuits 71. The specific address in the activated memory bank is then enabled through the address lines coupled to control bus interface 74.

The invention allows multiple master devices (CPUs and DMA engines) to overlap activation and access to multiple banks of memories. The "snooping" capability of the memory bus monitor 60 (FIG. 3) prevents two devices from trying to access the same memory bank during the same bus transaction. Since different processing devices can pipeline activation to different memory banks performance of a global memory system is increased.

Having described and illustrated the principles of the invention in a preferred embodiment thereof, it should be apparent that the invention can be modified in arrangement and detail without departing from such principles. I claim all modifications and variation coming within the scope of the following claims.

What is claimed is:

1. A memory system, comprising:

a main memory having multiple memory banks;

a memory bus coupled to the main memory;

multiple memory controllers each coupled between an associated processing device and the memory bus, the memory controllers each controlling access of the associated processing device to the multiple memory banks by independently monitoring which memory controllers are accessing each of the multiple memory banks, the memory controllers each generating a first control bus arbitration request signal for arbitrating activation for one of the memory banks over the memory bus and separately generating a second data bus request signal after the first control bus request signal, the second data bus request signal for arbitrating data transfers between the associated processing device and one of the memory banks activated pursuant to the first control bus arbitration request signal.

2. A memory system according to claim 1 wherein the memory controllers are adapted to generate another arbitration request signal in parallel and at the same time data is transferred over the memory bus between the associated processing device and the activated one of the memory banks.

3. A memory system according to claim 1 wherein the multiple memory controllers each include the following:

a memory bus monitor that separately monitors the memory bus for both activation states and data transfer states for each one of the memory banks; and a master controller coupled to the memory bus and memory bus monitor that generates the first control bus request signal and separately generates the second data bus request signal according to the separately monitored activation states and data transfer states for each one of the memory banks.

4. A memory system according to claim 1 wherein the memory controllers immediately generate the first control bus request signal for memory banks that are idle and delay generating the first control bus request signal for activated memory banks.

5. A memory system according to claim 1 including a control bus arbiter coupled to the memory bus that grants activation of the multiple memory banks according to the first control bus request signal and a separate data bus arbiter operating independently of the control bus arbiter that grants data transfer requests according to the second data bus request signal.

6. A memory system according to claim 5 wherein the control bus arbiter and the data bus arbiter each include the following:

multiple priority encoders each receiving bus requests from the memory controllers and providing different priority codes for granting bus requests;

a decoder coupled to each priority encoder for generating a bus grant signal according to one of the priority codes; and a priority state machine for enabling the different priority encoders.

7. A memory system according to claim 1 wherein each of the memory controllers includes the following:

a memory bus monitor that monitors the memory bus for activation states for each one of the memory banks; and a master controller coupled to the memory bus and memory bus monitor generating the first control bus request signal for requesting access to one of the memory banks in the main memory on behalf of the associated processing device anytime after the memory bus monitor indicates the requested one of the memory banks is not currently activated.

8. A memory system according to claim 7 wherein each of the memory controllers includes a bank state memory that tracks which memory banks are currently activated and prevents the master controller from generating the first control bus request to those activated memory banks.

9. A memory system according to claim 7 wherein each of the memory controllers further includes the following:

a bus interface coupled to the associated processing device bus for transferring commands and data with the associated processing device;

an address FIFO coupled between the bus interface and the master controller;

and a data FIFO coupled between the bus interface and the memory bus;

wherein the address FIFO and the data FIFO queues memory access requests for memory banks currently accessed by other processing devices.

10. A memory controller for providing access to a memory having multiple memory banks independently accessible by multiple independent processing systems, comprising:

a memory bus monitor coupled to the memory and monitoring access states for each one of the memory banks by any one of the processing systems; and a master controller coupled to the memory that receives data transfer requests from an associated one of the processing systems, the master controller initiating memory activation commands and data transfer commands on behalf of the associated one of the processing systems to a first one of the memory banks only when the memory monitor indicates the first one of the memory banks is not currently activated, the master controller generating a first control bus arbitration request signal for requesting activation for the first one of the memory banks over the memory bus and separately generating a second data bus arbitration request signal after the first control arbitration request signal for transferring data after the first one of the memory banks is activated pursuant to the first control bus arbitration request signal.

11. A memory controller according to claim 10 wherein the master controller only generates the second data bus arbitration request signal after the first control bus arbitration request signal has been granted and the first one of the memory banks is activated pursuant to the granted first control bus arbitration request signal.

12. A memory controller according to claim 11 wherein the master controller generates a second control bus arbitration request signal for requesting activation for a second one of the memory banks at the same time data is being transferred between the associated one of the processing systems and the activated first one of the memory banks.

13. A memory controller according to claim 12 further comprising a bank state memory that retains the access states for all of the memory banks.

14. A memory controller according to claim 13 further including:
  a bus interface coupled to a first bus;
  an address FIFO coupled between the bus interface and the master controller;
  a data FIFO coupled between the bus interface and a second memory bus coupled to the memory; and
  an address compare and sequencer coupled between the address FIFO and the memory bus monitor.

15. A method for controlling access by processing devices through a memory bus to a global memory having multiple memory banks, comprising:
  providing memory controllers between each processing device and the memory bus;
  independently monitoring with each of the memory controllers, requests by any one of the processing devices to access any one of the memory banks;
  independently tracking and maintaining with each of the memory controllers memory bank states identifying the processing devices accessing each of the memory banks;
  controlling with the memory controllers when the processing devices request the global memory by generating a first control bus arbitration request signal that requests activation for a first one of the memory banks over the memory bus according to the tracked memory bank states; and
  separately generating a first data bus arbitration request signal after the first control bus arbitration request signal that initiates transfer of data between one of the processing devices and the first one of the memory banks after the requested first one of the memory banks is activated pursuant to the first control bus arbitration request signal.

16. A method according to claim 15 further including:
  sending a second control bus arbitration request signal to a second one of the memory banks for one of the processing devices when the second one of the memory banks is not currently being accessed;
  activating the second one of the memory banks when the second control bus arbitration request is granted, the second one of the memory banks activated over the memory bus at the same time the first one of the memory banks is transferring data with one of the processing devices over the memory bus;
  sending a second data bus arbitration request signal after the second one of the memory banks is activated; and
  transferring data between the requesting processing device and the activated second one of the memory banks when the second data bus arbitration request signal is granted.

17. A method according to claim 16 further including arbitrating the control requests and data transfer requests according to the following steps:
  receiving the control requests to control the memory banks;
  granting the control requests according to a first arbitration process;
  receiving the data transfer requests to transfer data with the memory banks activated when the control requests are granted; and
  granting the data transfer requests according to a second arbitration process independently from the first arbitration process.

18. A method according to claim 16 further including requesting activation of a first one of the memory banks while waiting for activation of a second one of the memory banks or while one of the processing devices is transferring data with the second one of the memory banks.

19. A method according to claim 18 further including:
  generating control requests and data transfer requests from different processing devices to the memory banks;
  queuing up control requests and data transfer requests directed to memory banks currently being accessed; and
  initiating subsequently received control requests and data transfer requests before previously queued up requests when the memory banks for the subsequently received control requests are idle.

* * * * *